United States Patent [19]

Surman

[11] Patent Number: 5,522,540

[45] Date of Patent: Jun. 4, 1996

[54] SOLAR POWERED ILLUMINATED ADDRESS NUMBER DEVICE AND MAILBOX STRUCTURE

[76] Inventor: Robert L. Surman, 37287 N. Highway 59, Lake Villa, Ill. 60046

[21] Appl. No.: 524,600

[22] Filed: Sep. 7, 1995

Related U.S. Application Data

[63] Continuation-in-part of Ser. No. 230,846, Apr. 21, 1994, Pat. No. 5,460,325.

[51] Int. Cl.⁶ .................................................. B65D 91/00
[52] U.S. Cl. ................................................. 232/17; 40/566
[58] Field of Search ........................ 232/17, 38; 40/541, 40/566, 576; 362/20, 154, 163

[56] References Cited

U.S. PATENT DOCUMENTS

| | | |
|---|---|---|
| D. 313,106 | 12/1990 | Hoffman et al. . |
| 672,518 | 4/1901 | Wright ................................ 232/17 |
| 736,815 | 8/1903 | Brown ................................ 232/17 |
| 1,204,494 | 11/1916 | Sare ................................... 232/38 |
| 1,613,759 | 1/1927 | Loftin ............................... 362/154 |
| 1,659,351 | 2/1928 | Buccini .............................. 232/13 |
| 1,789,239 | 5/1929 | Landgraf . |
| 1,842,597 | 1/1932 | Foti ................................. 362/154 |
| 2,420,699 | 5/1947 | Cox ................................... 232/17 |
| 2,452,667 | 11/1948 | Lambert . |
| 2,635,681 | 3/1950 | Hiltman et al. . |
| 3,780,463 | 12/1973 | Aronoff . |
| 4,009,535 | 3/1977 | Stock . |
| 4,059,916 | 11/1977 | Tachihara et al. . |
| 4,319,310 | 3/1982 | Kingsley . |
| 4,410,930 | 10/1983 | Yachabach ......................... 362/183 |
| 4,486,820 | 12/1984 | Baba et al. . |
| 4,648,012 | 3/1987 | Pittman, II . |
| 4,648,013 | 3/1987 | Curiel . |
| 4,729,185 | 3/1988 | Baba . |
| 4,755,915 | 7/1988 | Rogers . |
| 4,777,749 | 10/1988 | Leo, Sr. . |
| 4,816,970 | 3/1989 | Garcia, Jr. . |
| 4,872,610 | 10/1989 | Grabowiecki . |
| 4,947,300 | 8/1990 | Wen . |
| 4,989,124 | 1/1991 | Shappell . |
| 5,007,190 | 4/1991 | Shyu ................................. 40/576 |
| 5,101,329 | 3/1992 | Doyle .............................. 362/183 |
| 5,107,637 | 4/1992 | Robbins ........................... 362/183 |
| 5,143,285 | 9/1992 | Wise . |

*Primary Examiner*—Blair M. Johnson
*Attorney, Agent, or Firm*—Charles F. Meroni, Jr.; Robert P. Toczycki

[57] ABSTRACT

A solar powered illuminated address number and mailbox structure comprising a tray structure, a mailbox, a solar energy collector structure exteriorly mounted on the mailbox, a circuit operatively connected to the solar energy collector structure mounted in the tray structure including a battery, and an address number light display mounted on an exterior surface of the mailbox, the solar energy collector providing a power source and connected through the circuit to charge the battery, the address number light display comprising a lighting means, an address display frame, a transparent display device, and reflective address numerals, the lighting means being attached to an exterior surface of the mailbox and being electrically connected with the circuit means and powered by the battery, the address display frame having a fastening means for securing the address display frame to an exterior surface of the mailbox, the reflective address numerals being attached to a back side of the transparent display device adjacent to the exterior surface of the mailbox, the transparent display device having a reflective tape attached along polished edges on the transparent display device leaving a small light opening on one edge, the lighting means being positioned adjacent a polished edge of the transparent display device such that light transmitted from the lighting means is directed through the small light opening on the transparent display device, whereby substantially all of the light entering the transparent display device will reflect within the transparent display device off of the reflective tape attached along the polished edges and the reflective address numerals thereby resulting in an unusually brilliant even display of the reflective address numerals.

23 Claims, 4 Drawing Sheets

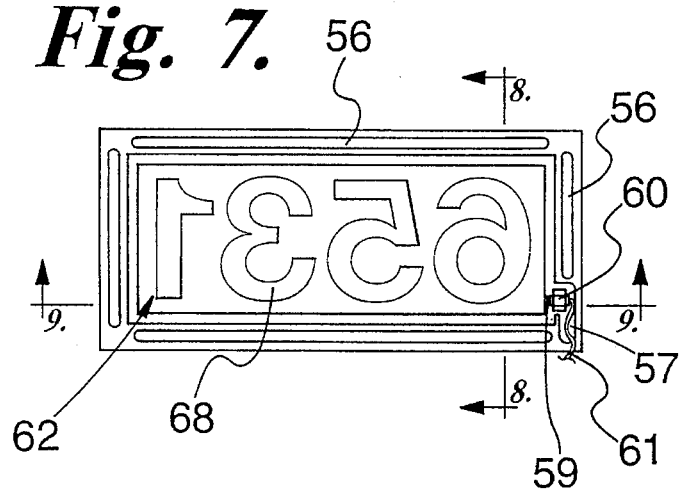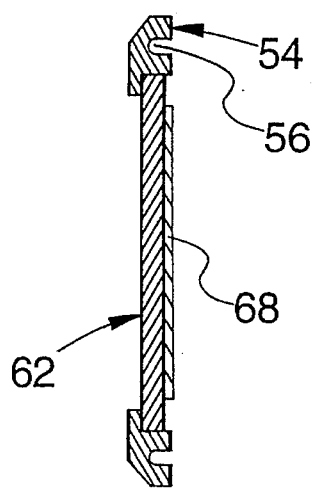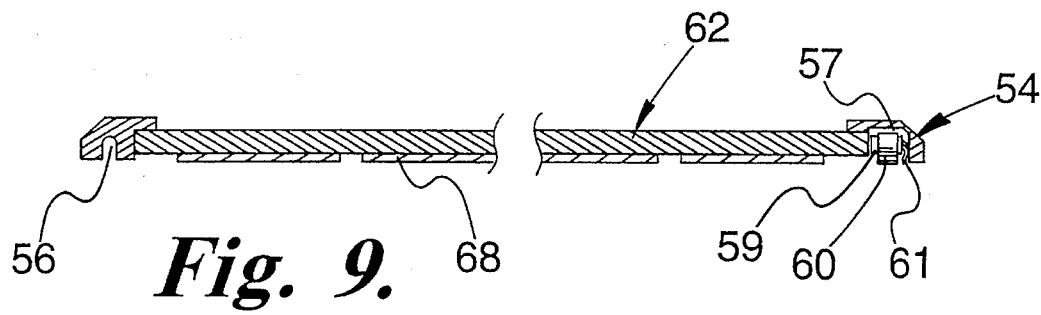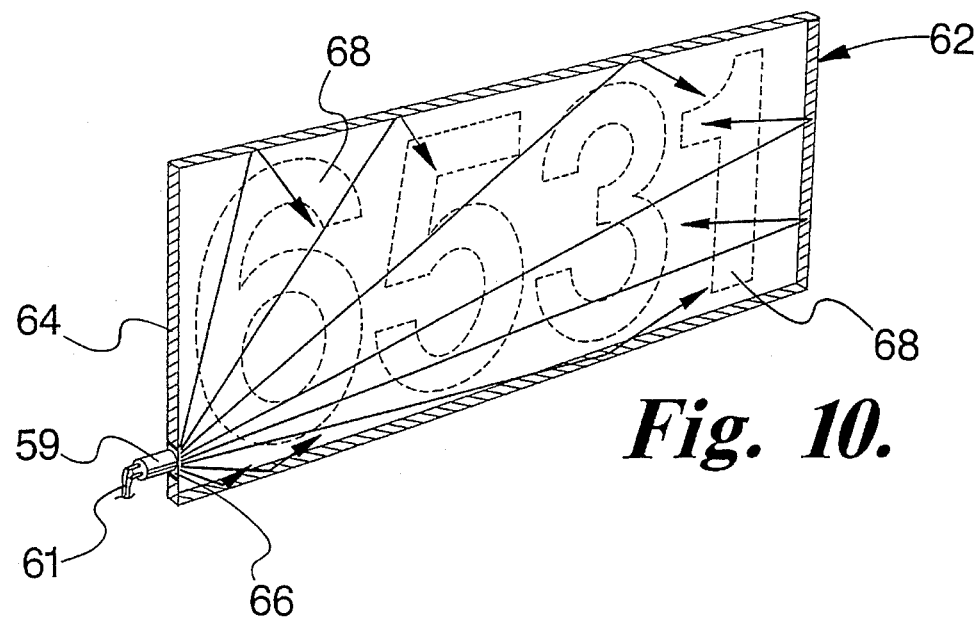

SOLAR POWERED ILLUMINATED ADDRESS NUMBER DEVICE AND MAILBOX STRUCTURE

This application is a Continuation-In-Part of my earlier filed U.S. patent application for patent entitled "Solar Lit Address Number Illuminated Mailbox Structure" filed on Apr. 21, 1994, and bearing U.S. patent application Ser. No. 08/230,846, now U.S. Pat. No. 5,460,325.

BACKGROUND OF THE INVENTION

1. Field of the Invention

The present invention relates generally to a solar powered illuminated address number device and mailbox structure. It is well known that often times it is difficult to find addresses of friends, relatives, business acquaintances and the like when traveling on the streets in an automobile or truck, particularly where traffic may be heavy or the streets may be poorly lit. This invention particularly concerns a new and improved apparatus or structure to provide illumination to address numbers provided on a mailbox structure to make it easier for passers by to read address numbers on mailboxes, including the urban type mailboxes that are mounted on a house, and the rural type mailboxes that are commonly used in suburban and rural areas in the U.S.A. and elsewhere in the world. This invention further concerns the easy installation and modification capabilities of the address numerals, thereby allowing one to replace an address with a decorated address or sign.

2. Description of the Prior Art

Based on my knowledge of the prior art, I have found that it has been common practice to place painted unlit address numbers on a mailbox post or on a mailbox. Also, I have found that there are various solar panel circuits and devices that are shown in a number of prior art patents as here after listed in the attached Information Disclosure Statement. Sometimes these mailbox numbers are light reflective. I am unaware of any usage, however, of electrically illuminated address numbers which are solar powered. This is an important advantage since electrical power is not generally available at a road side residential mailbox location.

SUMMARY OF THE INVENTION

According to my present invention I have provided in combination, a solar powered illuminated address number device and mailbox structure comprising an open topped tray structure, a mailbox, pivot means pivotally connecting the mailbox at one end to the open topped tray structure, solar energy collector structure exteriorly mounted on the mailbox, circuit means operatively connected to the solar energy collector structure mounted in the tray structure including a battery, an address number light display mounted on an exterior surface of the mailbox, the solar energy collector providing a power source and connected through the circuit means to charge the battery, the mailbox structure being pivotal on the pivot means to expose the circuit means stored in the open topped tray structure, the address number light display comprising a lighting means, an address display frame, a transparent display device, and reflective address numerals, the lighting means being attached to an exterior surface of the mailbox and being electrically connected with the circuit means and powered by the battery, the address display frame having a fastening means for securing the address display frame to an exterior surface of the mailbox, the transparent display device having two opposite flat surfaces and polished edges, the address display- frame being sized to hold the transparent display device to the exterior surface of the mailbox, the reflective address numerals being attached to a back side of the transparent display device adjacent to the exterior surface of the mailbox, a reflective tape attached along the polished edges of the transparent display device leaving a small light opening on one edge, the address display frame having a cavity on the backside to encompass the lighting means, the lighting means being positioned adjacent a polished edge of the transparent display device such that light transmitted from the lighting means is directed through the small light opening on the transparent display device, whereby substantially all of the light entering the transparent display device will reflect within the transparent display device off of the reflective tape attached along the polished edges and the reflective address numerals thereby resulting in an unusually brilliant display of the reflective address numerals.

Another feature of my invention relates to the combination described above wherein the solar energy collector structure is sized to envelope an external outer surface of the mailbox in nested engagement therewith, and adhesive means connecting the solar energy collector structure to the outer surface of the mailbox.

Still another feature of my invention involves the combination described above wherein the solar energy collector structure is connected to the circuit means with a wire and can be positioned in a location away from the mailbox structure such that the solar energy collector structure can be placed in a location to receive sunlight for recharging the battery.

A still further feature of my invention concerns the combination described above wherein manually operable latch means is provided between the open topped tray structure and the mailbox, the manually operable latch means being releasable to allow the mailbox to be pivoted on the pivot means so that access can be had to the circuit means mounted with an interior area of the open topped tray structure, the latch means being latchable again on pivoted movement of the mailbox on the pivot means to return the box to its latched position.

Yet another feature of my invention concerns the combination described above wherein the open topped stray structure defining a tray cavity with the circuit means being reposed in the tray cavity.

According to still further features of my invention concern the combination described above wherein the mailbox is comprised of a synthetic plastic and having downwardly angled lugs depending from a lower side of the mailbox, the pivot means further including fasteners extending through the lugs and sides of the open topped tray structure pivotally connecting the mailbox to the open topped tray structure.

An additional feature of my invention provides for a solar powered illuminated address number device and mailbox structure comprising a solar energy collector structure including a series of panels, means securing the solar energy collector structure exteriorly to the mailbox, circuit means attached to the mailbox, the circuit means being operatively connected to the solar energy collector structure, the circuit means including a battery, an address number light display mounted on an exterior surface of the mailbox electrically connected to the circuit means and powered by the battery, the solar energy collector providing a power source and connected through the circuit means to charge the battery.

Yet still another feature of my invention concerns the securement of the address display frame to the mailbox, wherein the fastening means comprises channeled protuberances arranged on the exterior surface of the mailbox, the channeled protuberances being sized and positioned to tightly fit in nested relationship into grooves located along backside edges on the address display frame, thereby providing easy removal and installation of the address display frame on the exterior surface of the mailbox.

Other objects, features and advantages of my invention will become more readily apparent upon reference to the following description when taken in conjunction with the accompanying drawings, which drawings illustrate several embodiments of my invention.

DESCRIPTION OF THE DRAWINGS

FIG. 7 is a back or rear side elevational view of the frame used in my solar powered address number display embodying important features of my invention;

FIG. 8 is a vertical cross-sectional side view of my solar powered address number display taken along the lines 8—8 shown in FIG. 7;

FIG. 9 is a horizontal cross-sectional view of my solar powered address number display taken along the lines 9—9 shown in FIG. 7; and FIG. 10 is a perspective view of my transparent display device used with my solar powered address number display showing how light is reflected within the transparent display device.

DETAILED DESCRIPTION OF THE PREFERRED EMBODIMENT

Figure 1:
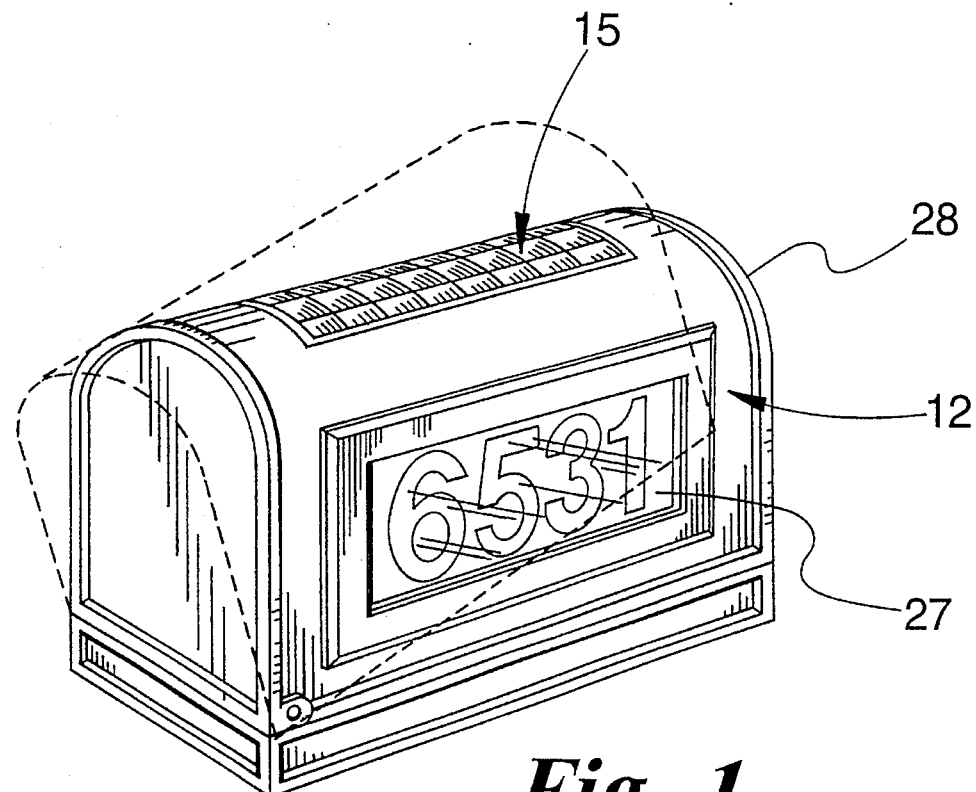
FIG. 1 is a perspective view of my solar powered illuminated address number device and mailbox structure embodying important features of my invention.
Figure 2:
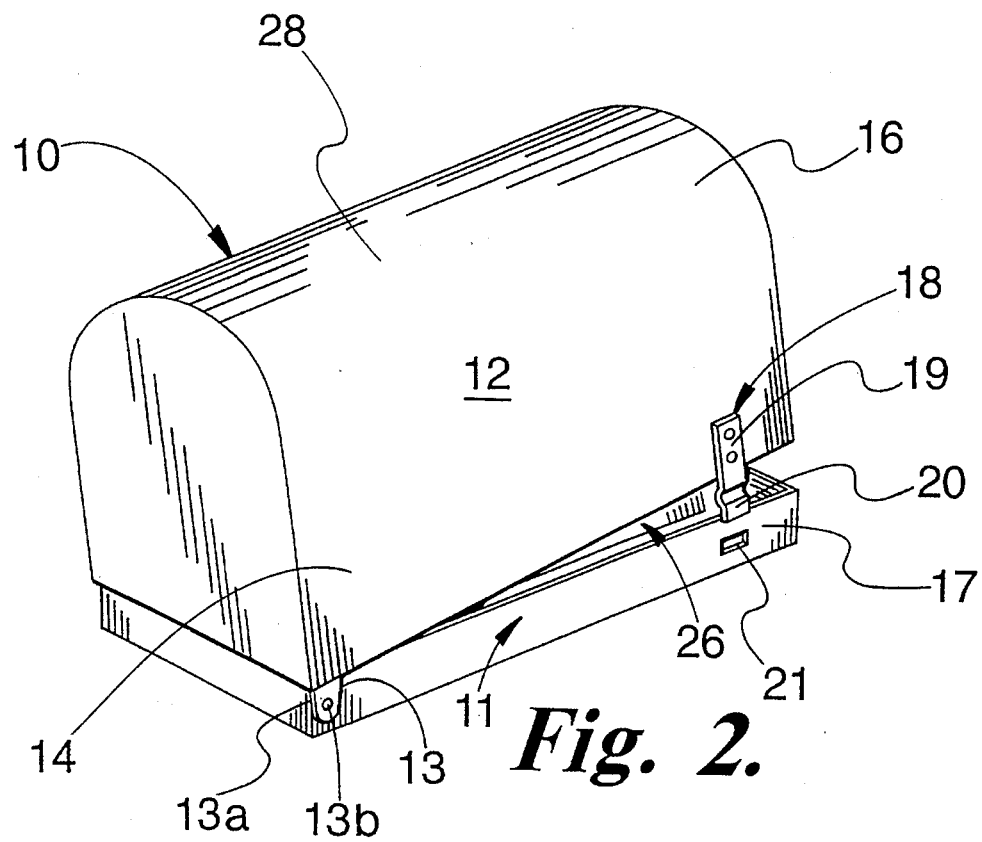
FIG. 2 is a perspective view similar to FIG. 1 only focusing on other details illustrating how my mailbox structure can be pivotally mounted on a base or tray structure so that diagramatically illustrated circuitry or electronics can be protectively housed in the tray structure and covered by the mailbox.

Referring now to the drawings, FIG. 1 shows my new and improved solar powered illuminated address number device and mailbox structure as indicated at 10. This structure 10 further includes an open topped tray structure 11 and a mailbox 12. A pivot 13 pivotally connects a forward end of the mailbox 12 to a forward end of the open topped tray structure 11. The pivotally connected means 13 is illustrated in the form of plastic molded tabs 13a. These tabs 13a are disposed on opposite sides of the mailbox structure 10 shown in FIG. 2. A suitable nut and bolt fastener and/or the like 13b serves to secure the plastic molded tabs 13a to the open topped tray structure 11 as shown in FIG. 2. The tabs 13a serve to provide anchors for the fastener to connect the mailbox 12 to the open topped tray structure 11 by means of a fastener to enable the mailbox 12 to pivot on the fastener 13b which constitutes the pivot 13. When the mailbox 12 is pivoted, its free end 16 is caused to elevate away from the open topped opposite tray end 17 of the open topped tray structure 11. In order to enable the mailbox 12 to be securely positioned on the tray structure 11, I have provided a latch structure means 18 which could be located on opposite sides of the mailbox 12 or at the end 16, as desired. The latch 19 has an outwardly protruding grooved latch end 20 which is adapted to engage with a molded latch keeper or bulged latch member 21 to securely fix the ends 16 of the mailbox 12 to the end 17 of the tray structure 11. When it is desired to disengage the latch, the latch end 20 is manually lifted off of the latch keeper 21 to disengage the latch 19 from the keeper so that the end 16 of the mailbox 12 can be elevated relative to the end 17 of the open topped tray structure 11 as seen in FIG. 2.

Figure 3:
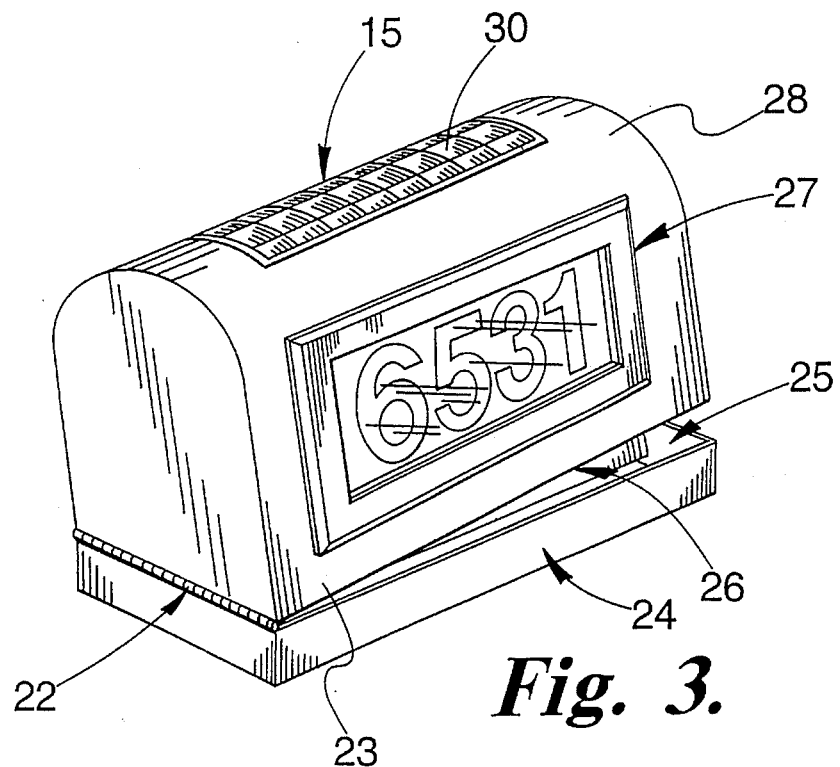
FIG. 3 is a perspective view of a mailbox structure similar to FIG. 2 only illustrating a modified plastic molded hinge for enabling the mailbox to pivot on the tray.
Figure 4:
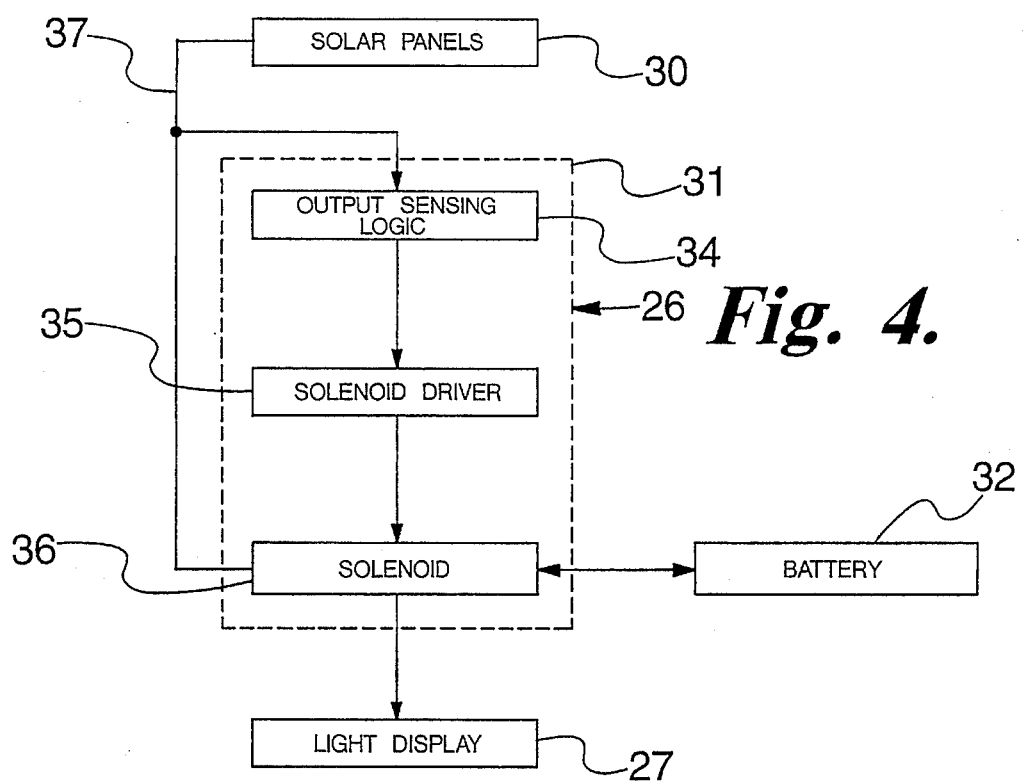
FIG. 4 is a schematic view of circuitry showing the way in which components can be electrically connected for the purpose of utilizing power from solar panels to charge a battery and light a light display mounted on a top or upper surface of a mailbox.

If desired, it will also be understood and appreciated that a plastic molded hinge structure 22, as shown in FIG. 3, can be molded integral with a mailbox 23 and an open topped tray structure 24 in such a way that then a pin can be inserted through hinge parts to connect the hinge parts together so that the mailbox 23 can pivot on the plastic molded hinge 22 relative to the open topped tray structure 11 to enable a person to gain access to an open area 25 where my electronics or circuit 26 is adapted to be disposed. Thus, the circuit 26 can be disposed in the tray area or cavity 25 as shown in FIG. 3 or in the corresponding open area also provided by the open topped tray structure 11 shown in FIG. 2.

Now it will also be appreciated that opposite sides of the mailbox 12 are adapted to be provided with an address number lighted display 27, as shown in FIG. 1, and embodying features of my invention. The solar panel 15 is generally of a U-shaped configuration so as to be in nested engagement with a top side 28 of my mailbox 12. The mailbox 12 can be of a metal construction or of a synthetic plastic construction, as desired.

According to other features of my invention, the electronics or circuit 26 of my improved solar powered illuminating device and mailbox structure includes: solar panels 30 which comprise the solar energy collector structure that is attached by means of a suitable adhesive to the mailbox 12. The electronics or circuit 26 further includes a rechargeable battery 32, and the lighted display 27. The assembly enclosure 31 includes output sensing logic 34, a solenoid driver 35, and a solenoid 36.

In the daylight hours, the solar panels 30 receive sunlight so that output 37 increases in voltage. When the output 37 increases above a predetermined level the output sensing logic 34 electrically activates the solenoid driver 35. The solenoid driver 35 then triggers the solenoid 36, which electrically disconnects the rechargeable battery 32 from the light display 27, and electrically connects the output 37 of the solar panels 30 to the rechargeable battery 32. As a result, the output 37 from the solar panels 30 charges the rechargeable battery 32 in stored capacity for future illumination.

After sunset, when the output 37 of the solar panels 30 decreases in voltage below a predetermined level, the output sensing logic 34 electrically deactivates the solenoid driver 35. In addition, the solenoid driver 35 deactivates the solenoid 36. After being deactivated the solenoid 36 electrically disconnects the output 37 of the solar panels 30 from the rechargeable battery 32 and electrically connects the rechargeable battery 32 to the light display 27. As a result, the rechargeable battery 32 illuminates the light display 27 for viewing of my improved solar powered mailbox illuminating system on opposite sides of the mailbox 12.

Figure 5:
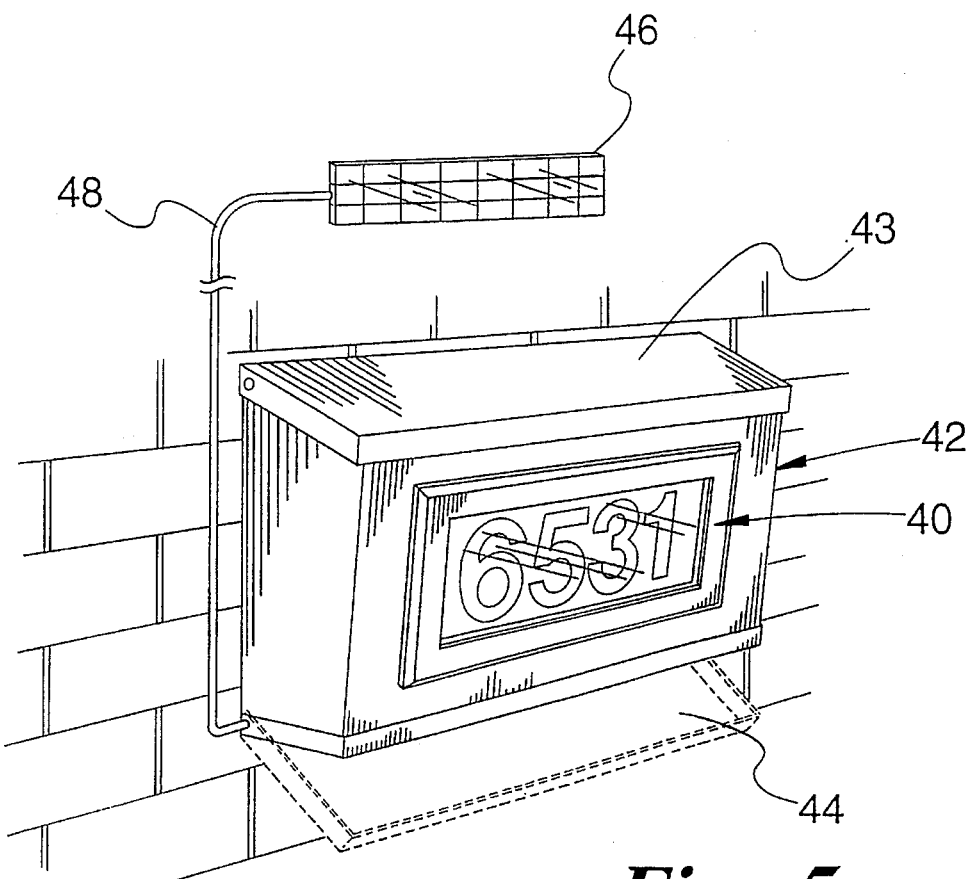
FIG. 5 is a perspective view of a modified type of a mailbox structure utilizing my improved solar powered illuminated address number device.

Shown in FIG. 5 is a modified solar powered illuminated address number device 40 embodying still other features of my invention which can also be used on an urban type mailbox 42 of the type having an upper lid 43. A lower tray structure 44 is pivotally mourned on the mailbox 42 to hold the electronic circuitry and rechargeable battery used to power the illuminated address number device 40. Since many urban mailboxes are not positioned or located in an area such that they can receive sunlight, the solar panel 46 can be extended by a wire 48 for placement of the solar panel in a location where sunlight may come into contact with it, such as on top of the patio roof covering the mailbox, on top of the house, or any other location that may be suitable.

To further enhance the abilities of quickly attaching the address number light display to the mailbox, I have provided a fastening device or means 49 that is mounted on the exterior surface of the mailbox, as shown in FIGS. 6–9. The fastening means comprises elongated channels or channeled fastening protuberances 50 positioned and aligned on an exterior surface of the mailbox 52. Excellent results are obtained when the fastening means is made of a molded, semi-flexible plastic material. The address display frame 54 has grooves 56 located on a backside of the address display frame. The grooves 56 are sized to tightly fit onto the channeled fastening protuberances 50 in nested engagement therewith, thereby providing a secured attachment of the address display frame onto the exterior surface of the mailbox. Furthermore, the address display frame has a cavity 57 sized to encompass a lighting structure or means 58. The lighting means 58 comprises a light bulb or an LED 59 and a clamp 60. The clamp 60 is used to hold the light bulb 59 in position against the mailbox. Excellent results can be obtained when the rechargeable battery is a 6 volt, 2.0 amp. battery and the electronic circuitry steps down the voltage to 1.5 volts to illuminate a 1.5 volt high intensity LED. It is contemplated that various different types of rechargeable batteries could be used to power the light bulb or LED 59 and numerous different types of light bulbs or LEDs could be used to illuminate the transparent display device. The intensity of the display will vary according to the brightness of the light bulb or LED. The clamp can be attached by a nut and bolt, a screw or a rivet to the exterior surface of the mailbox. The light bulb 59 is electrically connected with a wire 61 to the electric circuit to enable the power from the rechargeable battery to illuminate the light bulb 59.

The lighting means 58 is provided to light a transparent display device 62 and provide a uniform and brilliant illuminated display. The address display frame can be of a wooden or plastic construction, however, other suitable materials can also be used. The fastening device 49 therefore enables a user to press with their fingers the address display frame onto the exterior surface of the mailbox while having the transparent display device positioned within the address display frame. Additionally, a user can quickly remove the address display frame with their fingers by pulling on the edges of the address display frame, thereby enabling the user to clean, change or replace the transparent display device. Furthermore, this fastening device 49 does not require the user to remove, adjust, disengage or re-engage any electrical components including the lighting means.

Figure 6:
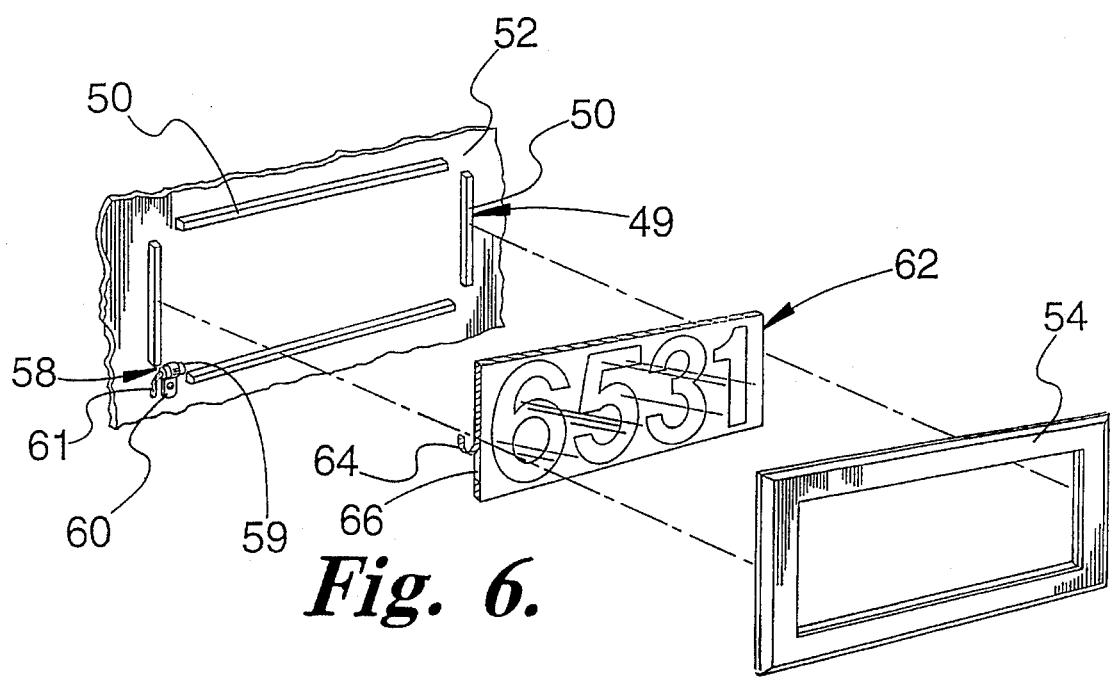
FIG. 6 is a fragmentary exploded perspective view illustrating the way in which my solar powered address number display is assembled.

The address display frame 54 is sized to hold the transparent display device 62 against the exterior surface of the mailbox 52. The lighting structure or means 58 is aligned against the mailbox adjacent to an outer edge of the transparent display device 62. The outer edges of the transparent display device 62 are polished to enable light to pass through the polished edges (FIGS. 6 and 10). The transparent display device can be composed of glass or plastic, including the type of transparent plastic known as Plexiglas. The edges of the transparent display device can be polished with fine sand paper. To enhance the reflectivity within the transparent display device, reflective tape 64 is attached along the polished edges. A small space 66 on the polished edges is not covered by the reflective tape 64 and is left uncovered to enable a light source to shine adjacent the edge. Reflective address numerals 68 are attached to a backside of the transparent display device 54 adjacent to the exterior surface of the mailbox. Excellent results can be obtained when the reflective address numerals and the reflective tape are of a mylar or white plastic and the color of the mailbox is black to provide a contrasting view. The reflective tape and the reflective address numerals are of typical white plastic tapes that can be purchased at a local hardware store. To further enhance the reflectivity of the light within the transparent display device, the tape should have a shiny or glossy surface. It is also contemplated that a light glossy paint can also be used to provide reflection of the lights within the transparent display device. It is also contemplated that the polished edges do not need to be covered with a reflective tape or coating if the inner edges of the address display frame that are adjacent to the polished edges of the transparent display device can provide a reflective and glossy surface to enable light to reflect within the transparent display device.

As light is passed into the edge of the transparent display device 62 through the small space 66, substantially all of the light entering the transparent display device will reflect within the transparent display device off of the reflective tape attached along the polished edges, as indicated by the arrows in FIG. 10, furthermore the light will also evenly reflect across the address numerals 68 thereby resulting in an unusually brilliant display of the address numerals. The lighted display of the address numerals appears quite brilliant and is evenly distributed, furthermore the display does not provide uneven lighting as may be seen using a display that provides lighting from the behind the display device.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. In combination, a solar powered illuminated address number and mailbox structure comprising an open topped tray structure, a mailbox, pivot means pivotally connecting the mailbox to said open topped tray structure, solar energy collector structure located exteriorly of the mailbox, circuit means operatively connected to said solar energy collector structure mounted in the tray structure including a battery, and an address number light display mounted on an exterior surface of the mailbox, the solar energy collector providing a power source and connected through said circuit means to charge said battery, the mailbox structure being pivotal on said pivot means to expose the circuit means stored in said open topped tray structure, said address number light display comprising a lighting means, an address display frame, a transparent display device, reflective address numerals, said lighting means being attached to an exterior surface of the mailbox and being electrically connected with said circuit means and powered by the battery, said address display frame having a fastening means for securing the address display frame to an exterior surface of the mailbox, said transparent display device having two opposite flat surfaces and polished edges, said address display frame being sized to hold said transparent display device to the exterior surface of the mailbox, said reflective address numerals being attached to a back side of said transparent display device adjacent to the exterior surface of the mailbox, and a reflective tape attached along the polished edges on said transparent display device leaving a small light opening on one edge, said address display frame having a cavity on the backside to encompass said lighting means, said lighting means being positioned adjacent a polished edge of the transparent display device such that light transmitted from said lighting; means is directed through the small light opening on the transparent display device, whereby substantially all of the light entering the transparent display device will reflect within the transparent display device off of the reflective tape attached along the polished edges and the reflective address numerals thereby resulting in an unusually brilliant even display of the reflective address numerals.

2. The combination of claim 1, wherein the solar energy collector structure is sized to envelope an external outer surface of the mailbox in nested engagement therewith, and adhesive means connecting the solar energy collector structure to the outer surface of the mailbox.

3. The combination of claim 1, wherein the solar energy collector structure is connected to the circuit means with a wire and can be positioned in a location away from the mailbox structure such that the solar energy collector structure can be placed in a location to receive sunlight for recharging the battery.

4. The combination of claim 1, wherein manually operable latch means is provided between the open topped tray structure anti the mailbox, the manually operable latch means being releasable to allow the mailbox to be pivoted on said pivot means so that access can be had to the circuit means mounted with an interior area of the open topped tray structure, the latch means being latchable again on pivoted movement of the mailbox on said pivot means to return the box to its latched position.

5. The combination of claim 1, wherein the open topped tray structure defines a tray cavity with said circuit means being reposed in the tray cavity.

6. The combination of claim 1, wherein the mailbox is comprised of a synthetic plastic and has downwardly angled lugs depending from a lower side of the mailbox, the pivot means .further including fasteners extending through the lugs and sides of the open topped tray structure pivotally connecting the mailbox to the open topped tray structure.

7. The combination of claim 1, wherein the mailbox is comprised of a synthetic plastic and has a hinge structure at one end of the mailbox which comprises said pivot means, the hinge structure enabling the mailbox to be pivoted on its end to provide access to the open topped tray structure for viewing of the circuit means housed in a cavity defined by the open topped tray structure, the bottom of the mailbox serving as a lid to close the cavity when the mailbox is pivoted to a closed position overlying the open topped tray structure.

8. The combination of claim 1, wherein said reflective address numerals are of a white mylar and said reflective tape is of a white mylar.

9. The combination of claim 1, wherein said fastening means comprises channeled protuberances arranged on the exterior surface of the mailbox, said channeled protuberances being sized and positioned to tightly fit in nested relationship into grooves located along backside edges on the address display frame thereby providing easy removal and installation of the address display frame on the exterior surface of the mailbox.

10. In combination, a solar powered illuminated address number and mailbox structure comprising an open topped tray structure, a mailbox, pivot means pivotally connecting the mailbox to said open topped tray structure, solar energy collector structure comprising a series of panels secured exteriorly to the mailbox, circuit means disposed in a cavity defined by said open topped tray structure, the circuit means being operatively connected to said solar energy collector structure, the circuit means including a battery, an address number light display mounted on an exterior surface of the mailbox, the solar energy collector providing a power source and connected through said circuit means to charge said battery, the mailbox structure being pivotal on said pivot means to expose the circuit means stored in said open topped tray structure, said address number light display comprising a lighting means, an address display frame, a transparent display device, and reflective address numerals, said lighting means being attached to an exterior surface of the mailbox and being electrically connected with said circuit means and powered by the battery, said address display frame having a fastening means for securing the address display frame to an exterior surface of the mailbox, said transparent display device having two opposite flat surfaces and polished edges, said address display frame being sized to hold said transparent display device to the exterior surface of the mailbox, said reflective address numerals being attached to a back side of said transparent display device adjacent to the exterior surface of the mailbox, said transparent display device having a reflective tape attached along the polished edges leaving a small light opening on one edge, said address display frame having a cavity on the backside to encompass said lighting means, said lighting means being positioned adjacent a polished edge of the transparent display device such that light transmitted from said lighting means is directed through the small light opening on the transparent display device whereby substantially all of the light entering the transparent display device will reflect within the transparent display device off of the reflective tape attached along the polished edges and the reflective address numerals thereby resulting in an unusually brilliant even display of the reflective address numerals.

11. The combination of claim 10, wherein the address number light display is mounted on one side of the mailbox.

12. The combination of claim 10, wherein the address number light display is mounted on both sides of the mailbox.

13. The combination of claim 10, wherein the solar energy collector structure is sized to envelope an external outer surface of the mailbox in nested engagement therewith, and adhesive means connecting the solar energy collector structure to the outer surface of the mailbox.

14. The combination of claim 10, wherein the solar energy collector structure is connected to the circuit means with a wire and can be positioned in a location away from the mailbox structure such that the solar energy collector structure can be placed in a location to receive sunlight for recharging the battery.

15. The combination of claim 10, wherein said reflective address numerals are of a white mylar and said reflective tape is of a white mylar.

16. The combination of claim 10, wherein said fastening means comprises channeled protuberances arranged on the exterior surface of the mailbox, said channeled protuberances being sized and positioned to tightly fit in nested relationship into grooves located along backside edges on the address display frame, thereby providing easy removal and installation of the address display frame on the exterior surface of the mailbox.

17. A solar powered illuminated address number and mailbox structure having a mailbox with an exterior surface and an underside, the structure comprising a solar energy collector structure including a series of panels, means securing the solar energy collector structure exteriorly of the mailbox, circuit means attached to the mailbox, the circuit means operatively connected to said solar energy collector structure, the circuit means including a battery, the mailbox having an interior mail compartment, and an address number light display mounted on an exterior surface of the mailbox, the address number light display disposed in a planar relationship to the exterior surface of the mailbox so that the interior mail compartment remains free of encumbrance from the address number light display, the solar energy collector providing a power source and connected through said circuit means to charge said battery, the mailbox having means defining a compartment on the underside, the battery and the electrical circuit being at least disposed in part in said compartment, the mailbox and the compartment being relatively movable with respect to one another to allow components such as the battery and the electrical circuit to be exposed for service, said address number light display comprising a lighting means, an address display frame, a transparent display device, and reflective address numerals, said lighting means being attached to an exterior surface of the mailbox and being electrically connected with said circuit means and powered by the battery, said address display frame having a fastening means for securing the address display frame to an exterior surface of the mailbox, said transparent display device having two opposite flat surfaces and polished edges, said address display frame being sized to hold said transparent display device to the exterior surface of the mailbox, said reflective address numerals being attached to a back side of said transparent display device adjacent to the exterior surface of the mailbox, said transparent display device having a reflective tape attached along the polished edges leaving a small light opening on one edge, said address display frame having a cavity on the backside to encompass said lighting means, said lighting means being positioned adjacent a polished edge of the transparent display device such that light transmitted from said lighting means is directed through the small light opening on the transparent display device, whereby substantially all of the light entering the transparent display device will reflect within the transparent display device off of the reflective tape attached along the polished edges and the reflective address numerals thereby resulting in an unusually brilliant even display of the reflective address numerals.

18. The solar powered illuminated address number and mailbox structure of claim 17, wherein the address mounted display is mounted on both sides of the mailbox.

19. The solar powered illuminated address number and mailbox structure of claim 17, wherein housing means is provided for the mailbox structure and said circuit is stored therein and electronically connected to said address number light display.

20. The solar powered illuminated address number and mailbox structure of claim 17, wherein the solar energy collector structure is sized to envelope an external outer surface of the mailbox in nested engagement therewith, and adhesive means connecting the solar energy collector structure to the outer surface of the mailbox.

21. The solar powered illuminated address number and mailbox structure of claim 17, wherein the solar energy collector structure is connected to the circuit means with a wire and can be positioned in a location away from the mailbox structure such that the solar energy collector structure can be placed in a location to receive sunlight for recharging the battery.

22. The solar powered illuminated address number and mailbox structure of claim 17, wherein said reflective address numerals are of a white mylar and said reflective tape is of a white mylar.

23. The solar powered illuminated address number and mailbox structure of claim 17, wherein said fastening means comprises channeled protuberances arranged on the exterior surface of the mailbox, said channeled protuberances being sized and positioned to tightly fit in nested relationship into grooves located along backside edges on the address display frame, thereby providing easy removal and installation of the address display frame on the exterior surface of the mailbox.

* * * * *